(12) United States Patent
Radhakrishnan et al.

(10) Patent No.: US 8,947,823 B1
(45) Date of Patent: Feb. 3, 2015

(54) METHOD AND APPARATUS FOR DETECTING DRIVE HEAD TOUCHDOWN

(71) Applicant: Marvell International Ltd., Hamilton (BM)

(72) Inventors: Rathnakumar Radhakrishnan, Santa Clara, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/199,269

(22) Filed: Mar. 6, 2014

Related U.S. Application Data (60) Provisional application No. 61/780,241, filed on Mar. 13, 2013.

(51) Int. Cl.
*G11B 21/02* (2006.01)
*G11B 5/60* (2006.01)

(52) U.S. Cl.
CPC .................................. *G11B 5/6076* (2013.10)
USPC ........................................................ 360/75

(58) Field of Classification Search
None
See application file for complete search history.

(56) References Cited

U.S. PATENT DOCUMENTS

| | | | | |
|---|---|---|---|---|
| 7,483,234 B2* | 1/2009 | Shimozato | ...................... | 360/75 |
| 7,623,314 B2* | 11/2009 | Yamashita et al. | .............. | 360/75 |
| 7,706,095 B2* | 4/2010 | Boutaghou et al. | ............. | 360/75 |
| 8,000,054 B2* | 8/2011 | Urata | ............................... | 360/75 |
| 8,730,602 B2* | 5/2014 | Yang | ............................... | 360/31 |

\* cited by examiner

*Primary Examiner* — K. Wong (57) ABSTRACT

A method of detecting head touchdown in a storage device includes monitoring storage device head contact sensor signals, and processing the monitored storage device head contact sensor signals in a digital domain. The processing may occur in a data path of the storage device, such as the read channel of the storage device. The processing may monitor for head touchdown only during other than read operations. Further, during servo read operation, the storage device head contact sensor may continue to generate signals, and the storage device head contact sensor signals may be squelched. Storage device head contact sensor signals also may be squelched during intervals before and after the servo read operation. The processing may includes accumulating a moving sum of squares of the storage device head contact sensor signals, and comparing the moving sum of squares of the storage device head contact sensor signals to a threshold.

18 Claims, 12 Drawing Sheets

METHOD AND APPARATUS FOR DETECTING DRIVE HEAD TOUCHDOWN

CROSS REFERENCE TO RELATED APPLICATION

This claims the benefit of commonly-assigned U.S. Provisional Patent Application No. 61/780,241, filed Mar. 13, 2013, which is hereby incorporated by reference herein in its entirety.

FIELD OF USE

This disclosure relates to data storage systems of the type in which read and write heads move over the surface of a storage medium. More particularly, this disclosure relates to detecting when the head touches that surface.

BACKGROUND

In magnetic recording, as one example, reading and writing are performed by one or more heads that move relative to the surface of the storage medium. The head typically flies above the surface, supported by a cushion of air, which is sometimes referred to as an "air bearing." However, under some circumstances—e.g., when the storage device is dropped while in operation—the head may touch the surface. Such an occurrence may be referred to as "touchdown" or, more colloquially, a "head crash."

When touchdown occurs, contact between the head and the surface of the storage medium may so damage the head, the surface of the storage medium, or both, so that the storage device can no longer be used, particularly if contact persists for an extended period of time.

SUMMARY

According to one implementation, a method of detecting head touchdown in a storage device includes monitoring storage device head contact sensor signals, and processing the monitored storage device head contact sensor signals in a digital domain.

In one variant of that implementation, the processing occurs in a data path of the storage device.

In another variant of that implementation, the processing occurs in a read channel of the storage device.

According to that variant, the processing may monitor for head touchdown only during other than read operations. As a further option, during servo read operation, the storage device head contact sensor may continue to generate signals, and the storage device head contact sensor signals may be squelched. Further, the storage device head contact sensor signals may be squelched during an interval following the servo read operation. Alternatively, or in addition, the storage device head contact sensor signals may be squelched during an interval preceding the servo read operation.

In another variant of that implementation, the processing includes accumulating a moving sum of squares of the storage device head contact sensor signals, and comparing the moving sum of squares of the storage device head contact sensor signals to a threshold.

According to another implementation, apparatus for detecting head touchdown in a storage device includes a storage device head contact sensor, and a processing module that processes storage device head contact sensor signals in a digital domain. The processing module maybe in a data path of the storage device. In particular, the processing module may be in a read channel of the storage device.

The processing module may monitor for head touchdown only during other than read operations. For example, servo read operation, the storage device head contact sensor may continue to generate signals, with the processing module further including servo-squelch control to squelch the storage device head contact sensor signals during servo read operation.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

For the reasons set forth above, it is important to be able to detect touchdown events as soon as possible. It is known to provide a touchdown sensor in a disk drive head and to process signals from that sensor in the analog domain. Such processing occurs once for every disk revolution.

This disclosure relates to a method and apparatus for detecting touchdown, in which the touchdown sensor signal is processed in the digital domain—e.g., in the read channel, when the read channel is otherwise idle (including during write operations). One result of using the read channel is that the signal can be processed once per servo wedge—i.e., multiple times per disk revolution. Because that is significantly more frequently than in the analog technique, it is possible to respond to a touchdown event more quickly, increasing the likelihood that damage rendering the storage medium unusable can be avoided, and to identify the touchdown location.

Figure 1:
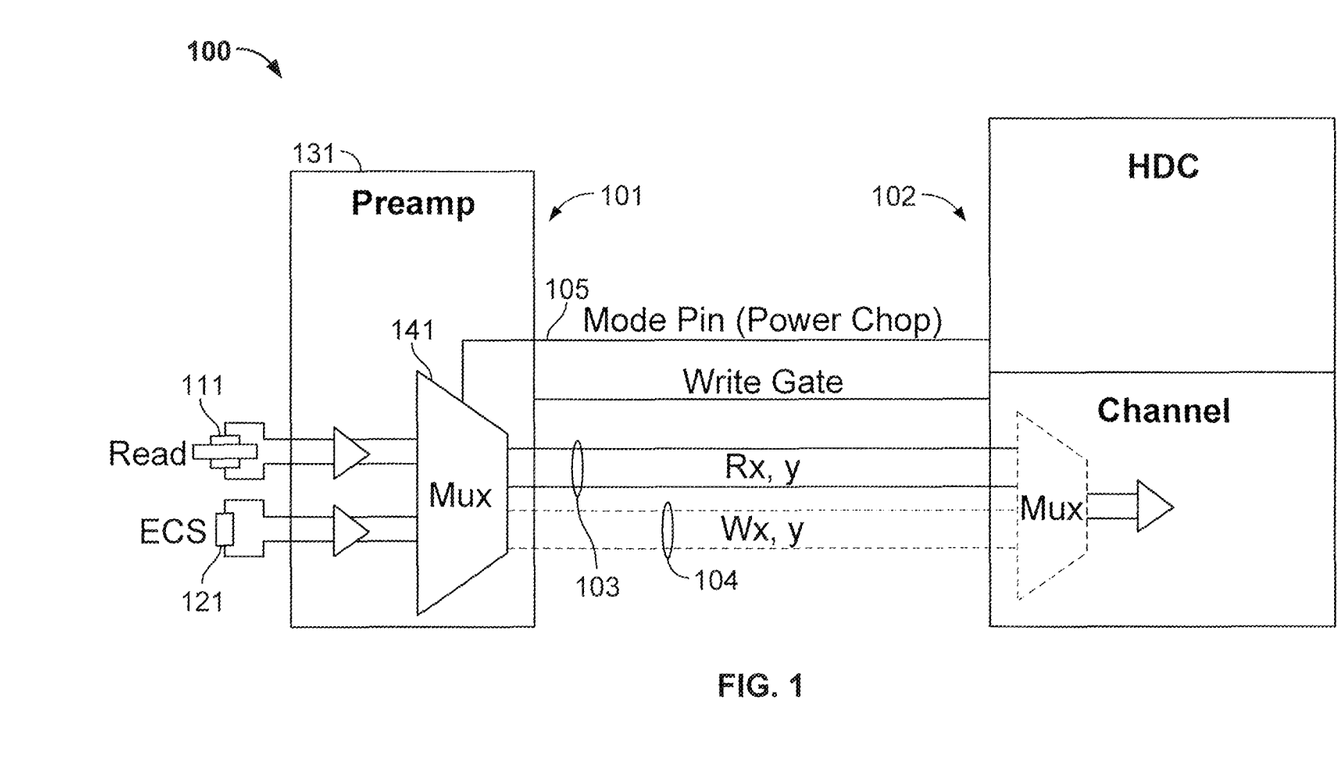
FIG. 1 is a schematic representation of an implementation according to this disclosure.

FIG. 1 is a schematic representation of an implementation 100 of apparatus which may be used in accordance with implementations of this disclosure, and which includes a disk drive head 101 and controller 102, with read and write channels 103, 104. Disk drive head 101 may include a read sensor 111 and a contact sensor (CS) 121, along with a preamplifier 131. Preamplifier 131 includes a multiplexer 141 that, under control of signal 105 from controller 102, selects either read head 111 or CS 121 for output onto read channel Rx,y (103). There also is a separate write head (not shown), and the write data are input to disk drive head 101 from write channel Wx,y (104). CS 121 may be an embedded contact sensor such as that provided, for example, in disk drives available from Western Digital Corporation.

Figure 2:
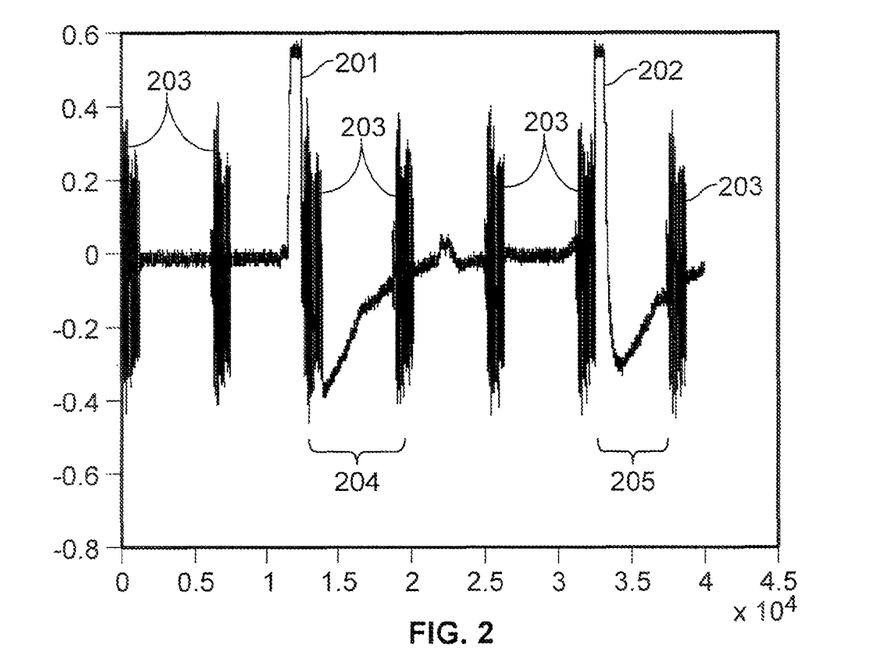
FIG. 2 is a representation of the output of a contact sensor in an example of intermittent touchdown.
Figure 3:
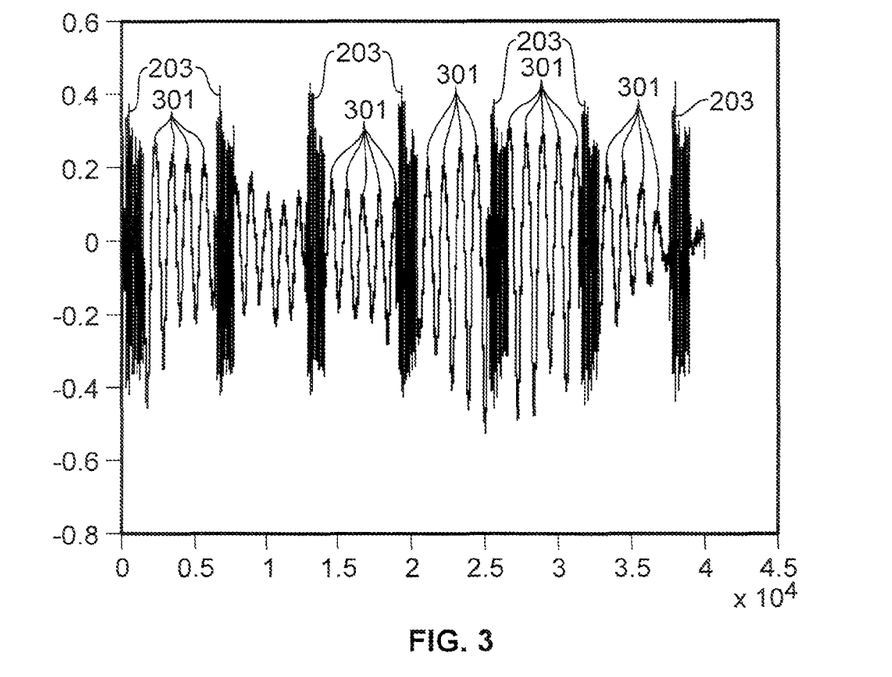
FIG. 3 is a representation of the output of a contact sensor in an example of full touchdown.

At least two types of touchdown may occur. In "intermittent" touchdown, where head 111 does not actually touch the disk surface but the fly height of head 111 is low enough for head 111 to contact lubricant particles, power of the signal output by contact sensor 121 increases, as shown by peaks 201, 202 in the output of CS 121 as shown in FIG. 2. Peaks 203 represent servo read activity once during each servo wedge. In regions 204, 205, respectively following peaks 201, 202, there is some rebounding of the detected power consumption, but no other signals. In "full" touchdown, there is both an increase in power of the signal output by contact sensor 121 along with resonance of head 111 in the range of about 150 kHz to about 500 kHz, both represented in FIG. 3 by repeating peaks 301 in the output of CS 121.

Known touchdown detectors sampled the CS output (when selected by multiplexer 141) and processed it in the analog domain (e.g., in preamplifier 131 or in a separate circuit (not shown)). One consequence was that the signal was sampled only once each revolution, so that it was not possible to distinguish between intermittent touchdown and full touchdown. Therefore all touchdown had to be assumed to be full touchdown and the system had to react accordingly. (For example, while in the case of intermittent touchdown, it might be sufficient to rewrite the affected sectors, in the case of full touchdown it would be necessary to stop the disk from spinning to try to prevent irreparable damage.) Moreover, the time to detection was slower, because one might have to wait for a full revolution to occur, rather than a single servo wedge.

In accordance with implementations of the present disclosure, the output of CS 121 is processed digitally in the read data channel 122 of controller 102. Not only does such processing allow faster detection—on the order of the duration of one servo wedge—but also more discriminating detection which can differentiate between full touchdown and intermittent touchdown.

Figure 4:
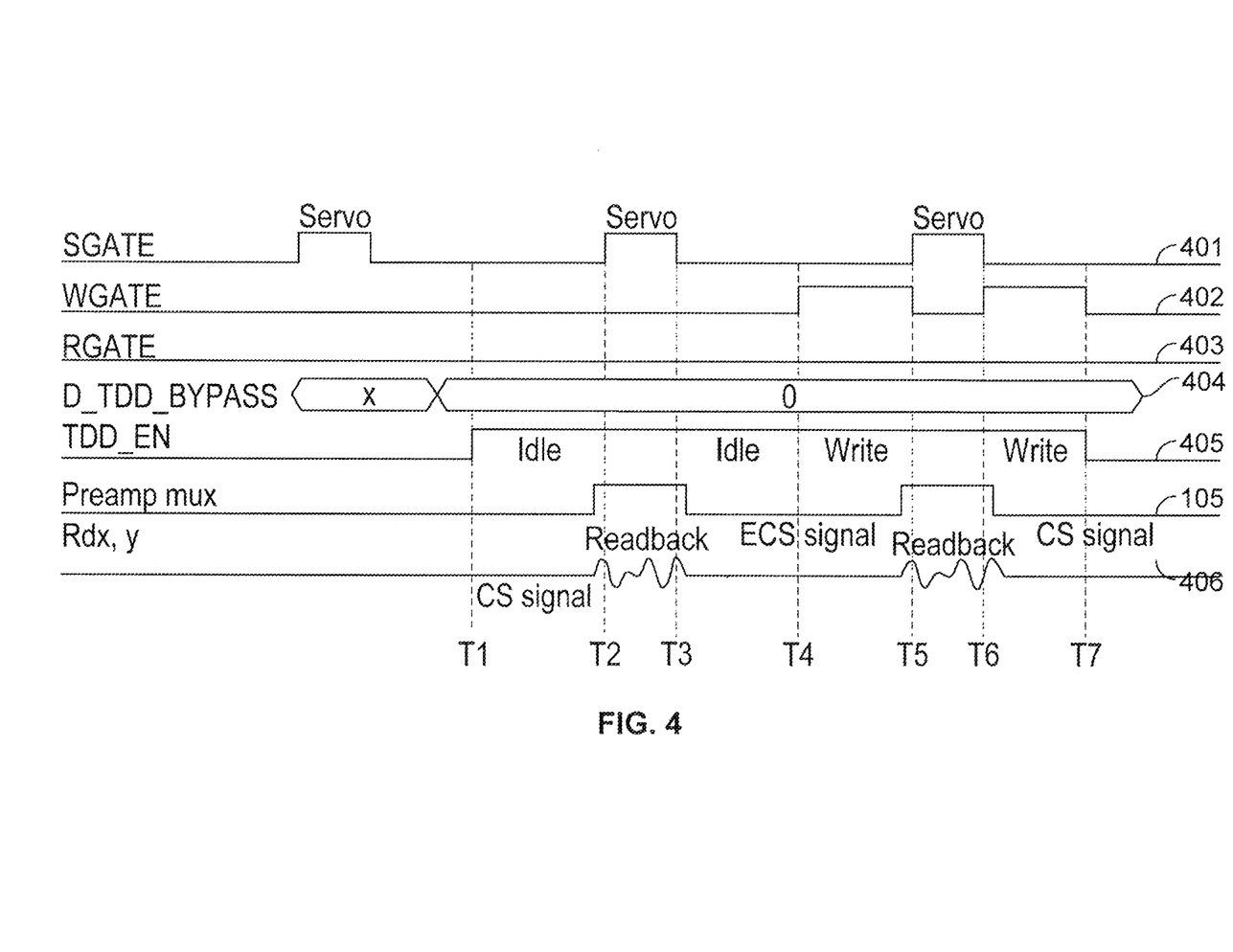
FIG. 4 shows control signal waveforms for an implementation of a touchdown detector according to this disclosure.

FIG. 4 shows control signal waveforms for an implementation of a touchdown detector according to this disclosure. The illustrated control signals include servo gate (SGATE) signal 401, write gate (WGATE) signal 402, read gate (RGATE) signal 403, touchdown detector bypass (D_TDD_BYPASS) signal 404, touchdown detector enable (TDD_EN)_— (TDD_EN) 405, pre-amplifier multiplexer (preamp mux) signal 105, and read channel (Rdx,y) signal 406.

For the entire time interval represented by FIG. 4, RGATE signal 403 remains low. If RGATE signal 403 were to be asserted, putting apparatus 100 in read mode, the touchdown detector could not be operated because preamp mux signal 105 would have to be asserted continuously to cause multiplexer 141 to select read sensor 111 and not CS 121.

For all relevant times in FIG. 4, D_TDD_BYPASS signal 404 is not asserted, allowing the touchdown detector to operate. D_TDD_BYPASS signal 404 is separate from TDD_EN signal 405 and may come from a different source. For example, TDD_EN signal 405 may be generated by controller 102, while D_TDD_BYPASS signal 404 could be controlled from an external source, such as a host system (and therefore by the user). In this example, TDD_EN signal 405 is asserted at time T1 and deasserted at time T7. Within the interval T1-T7, SGATE signal 401 is asserted during servo intervals T2-T3 and T5-T6 and WGATE signal 402 is active during intervals T4-T5 and T6-T7, while the channel is idle during intervals T1-T2 and T3-T4.

As can be seen, during the entire interval T1-T7, Rdx,y signal 406 represents the output of CS 121, except during servo intervals T2-T3 and T5-T6 (and some guard or "squelch" regions before and after those intervals as discussed below), when Preamp mux signal 105 is active to select readback signal 407 from read sensor 111. Thus, Rdx,y signal 406 represents the output of CS 121 during both idle and write intervals.

Figure 5:
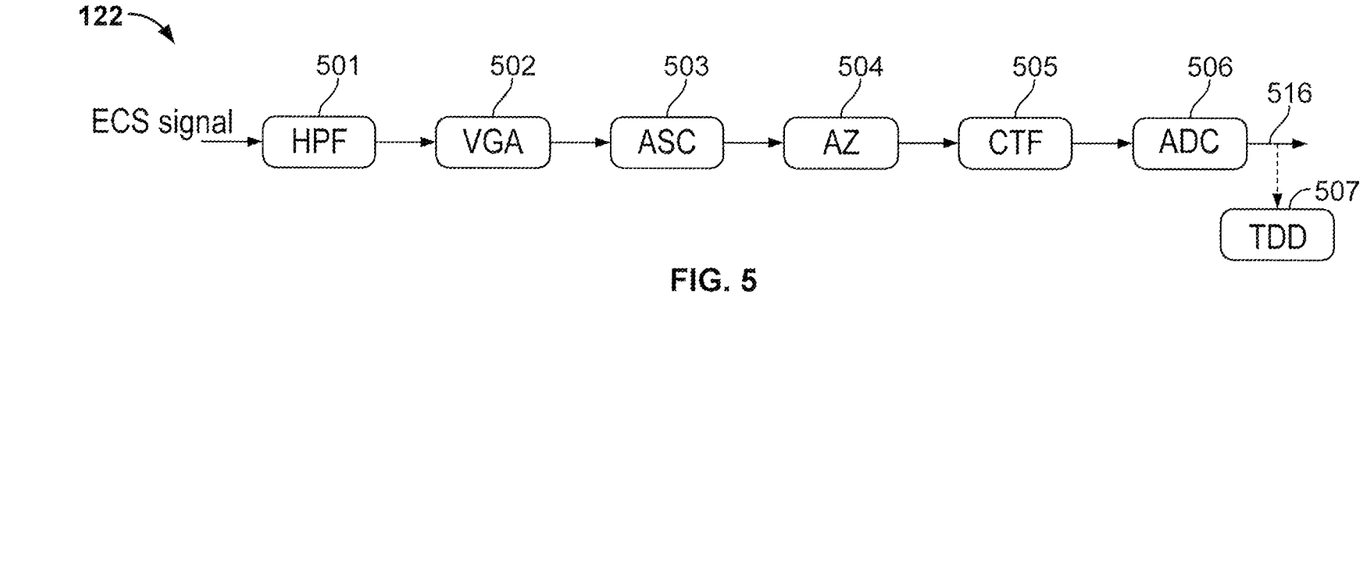
FIG. 5 is a representation of a read data channel incorporating a touchdown detector according to an implementation of this disclosure.

As discussed above, touchdown detector 607 is implemented in accordance with this disclosure in the digital domain in read data channel 122. As seen in FIG. 5, read channel 122 may include a high-pass filter (HPF) 501, variable-gain amplifier (VGA) 502, asymmetry correction (ASC) 503, auto-zero (AZ) control 504, continuous time filter (CTF) 505, and analog-to-digital converter (ADC) 506. The output 516 of ADC 506 is the readback signal in ordinary read mode, but is input to touchdown detector (TDD) 507 for use in TDD mode.

High-pass filter (HPF) 501, variable-gain amplifier (VGA) 502, asymmetry correction (ASC) 503, auto-zero (AZ) control 504, and continuous time filter (CTF) 505 may together be considered an analog front end to analog-to-digital converter (ADC) 506. While not all of these components may be needed for touchdown detection, because touchdown detection is being done in the read channel, the CS signals will pass through these components. Therefore, it is advantageous to be able to configure these components for touchdown detector operation.

Figure 6:
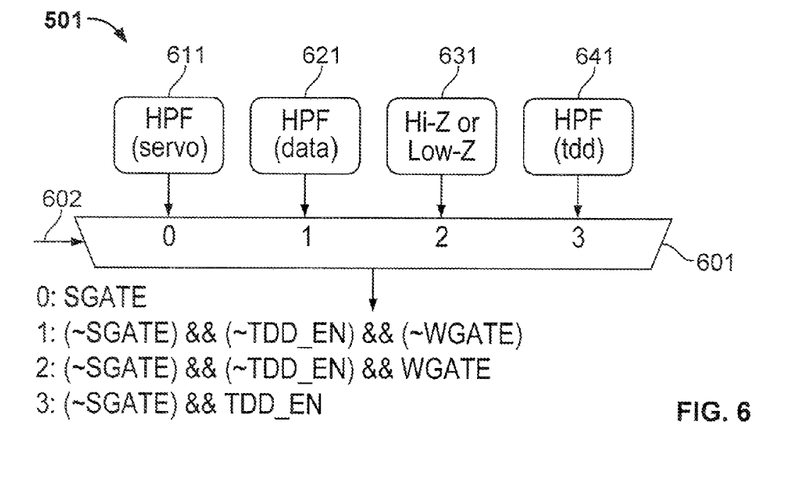
FIG. 6 is a representation of an example of a high-pass filter in the read data channel of FIG. 5.

High-pass filter (HPF) 501 may be configured as shown in FIG. 6. While HPF 501 could be implemented as a circuit shown in FIG. 6 with a four-input multiplexer 601 having three control inputs 602 (SGATE, TDD_EN and WGATE), FIG. 6 should be considered as a logical representation, implemented by any suitable circuit. Thus, if SGATE is asserted (i.e., in servo mode), a filter 611 with a cutoff frequency suitable for servo mode may be selected. If none of the three control signals is asserted, then the channel is idle or in read mode, and a filter 621 with a cutoff frequency suitable for data may be selected. If only WGATE is asserted, then the channel is in write mode and a filter 631 with two user-selectable cutoff frequencies (one for high-impedance operation and one for low-impedance operation—which could be input "live" or from programmed registers) suitable for writing may be selected. And, for touchdown detector operation, when TDD_EN is asserted and SGATE is deasserted, a filter 641 with a cutoff frequency or frequencies suitable for TDD operation (e.g., "normal" and "fine" filtering, as is well known) may be selected by the user and could be input "live" or from programmed registers.

Figure 7:
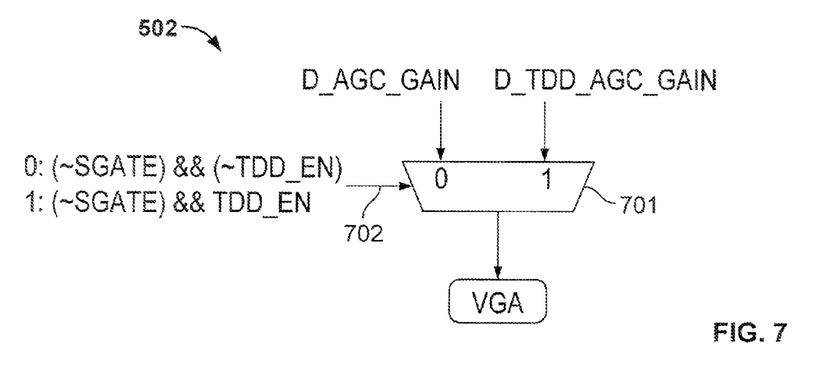
FIG. 7 is a representation of an example of a variable-gain amplifier in the read data channel of FIG. 5.

Variable-gain amplifier (VGA) 502 may be configured as shown in FIG. 7. While VGA 502 could be implemented as a circuit shown in FIG. 7 with a two-input multiplexer 701 having two control inputs 702 (SGATE and TDD_EN), FIG. 7 should be considered as a logical representation, implemented by any suitable circuit. If neither SGATE nor TDD_EN is asserted, then the automatic gain control initialization values (which may be user-defined registered values—which could be input "live" or from a programmed register) may be selected, but if TDD_EN is asserted (and SGATE is not), then TDD mode is active and a fixed gain, which may be a user-defined registered value, may be selected.

Figure 8:
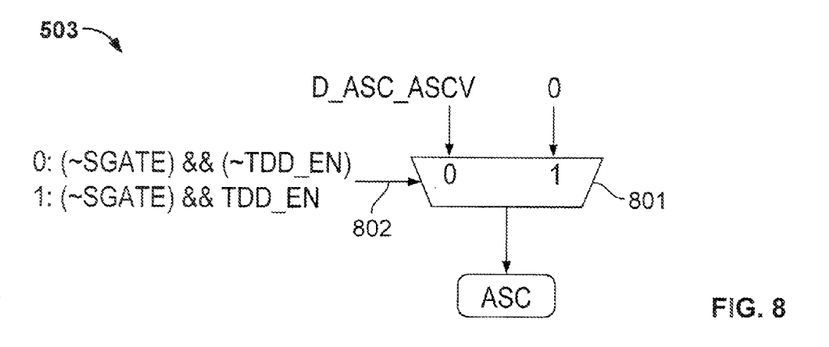
FIG. 8 is a representation of an example of an asymmetry correction module in the read data channel of FIG. 5.

Asymmetry correction (ASC) 503 may be configured as shown in FIG. 8. While ASC 503 could be implemented as a circuit shown in FIG. 8 with a two-input multiplexer 801 having two control inputs 802 (SGATE and TDD_EN), FIG. 8 should be considered as a logical representation, implemented by any suitable circuit. If neither SGATE nor TDD_EN is asserted, then the regular ASC control value (which may be a user-defined registered value—which could be input "live" or from a programmed register) may be selected, but if TDD_EN is asserted (and SGATE is not), then TDD mode is active and ASC is not necessary, so a zero value may be selected.

Figure 9:
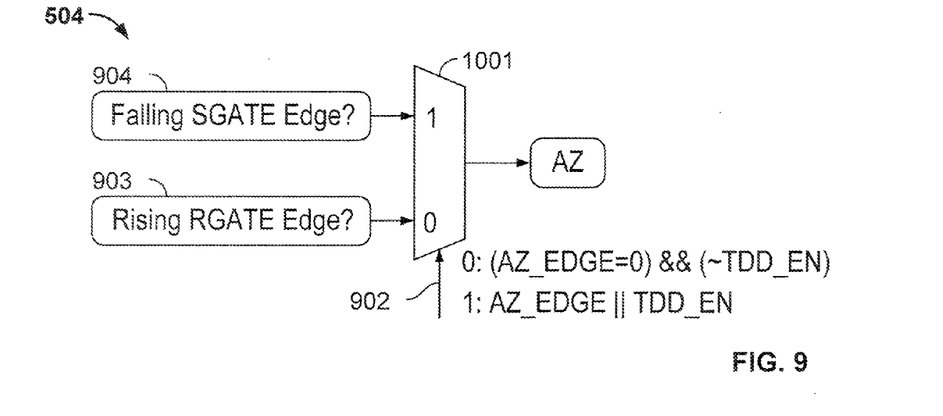
FIG. 9 is a representation of an example of an auto-zero tuning module in the read data channel of FIG. 5.

Auto-Zero tuning (AZ) 504 may be configured as shown in FIG. 9. While AZ 504 could be implemented as a circuit shown in FIG. 9 with a two-input multiplexer 901 having two control inputs 902 (AZ_EDGE and TDD_EN), FIG. 9 should be considered as a logical representation, implemented by any suitable circuit. If neither AZ_EDGE nor TDD_EN is asserted, then auto-zero tuning occurs on the rising edge 903 of RGATE signal 403 (because it is important to establish a correct zero-level before reading data). But if AZ-EDGE=1, or if TDD_EN is asserted (regardless of the state of AZ_EDGE), then auto-zero tuning occurs on the falling edge 904 of SGATE signal 401 (because it is important to establish a correct zero-level when exiting servo mode into TDD mode).

Continuous time filter (CTF) 505 may be conventional, operating either in a servo mode, or in a data mode (including during TDD operation).

Figure 10:
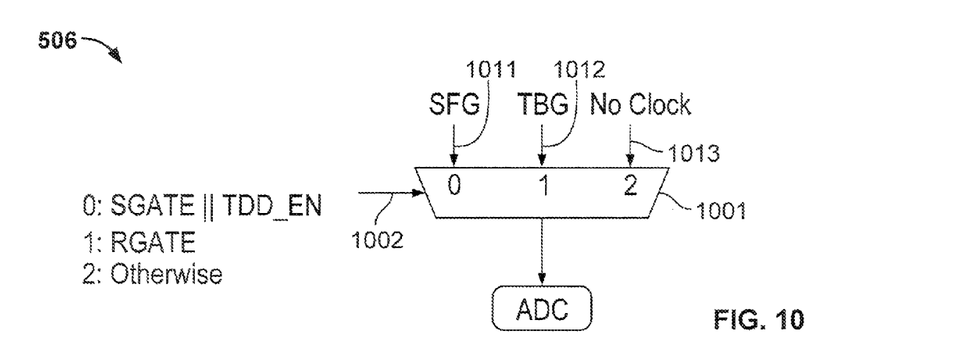
FIG. 10 is a representation of an example of an analog-to-digital converter in the read data channel of FIG. 5.

Analog-to-digital converter (ADC) 506 may be configured as shown in FIG. 10. While ADC 506 could be implemented as a circuit shown in FIG. 10 with a three-input multiplexer 1001 having three control inputs 1002 (SGATE, RGATE and TDD_EN), FIG. 10 should be considered as a logical representation, implemented by any suitable circuit. ADC 506 need not be clocked during idle or write, but is clocked by the servo clock (servo frequency generator SFG) 1011 if either SGATE signal 401 or TDD_EN signal 405 is asserted—i.e., in servo mode or TDD mode. ADC 506 is clocked by read clock (time base generator TBG) 1012 if RGATE signal 403 is asserted—i.e., in read mode. Otherwise—i.e., during idle or write mode, "no clock" input 1013 is selected.

Figure 11:
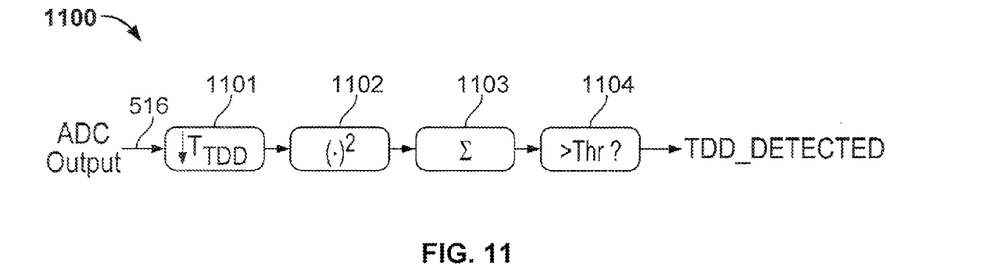
FIG. 11 is a representation of an example of an touchdown detection scheme according to implementations of this disclosure.

TDD circuit or module 507 may implement the detection scheme 1100 diagrammed in FIG. 10. The CS signal will have been high-pass filtered in the analog front end to eliminate low-frequency noise and transients. However, the touchdown resonance tone is at about 500 kHz, or about 1/1000th of a 500 MHz SFG clock. Therefore, the digitized CS signal 516 can be heavily decimated at 1101 to reduce circuit complexity without performance degradation. For example, a decimation factor of 32 may be used. Next, the sum 1103 of the square 1102 of decimated digitized CS signal samples 516 may be computed over a moving window (as discussed below) and compared at 1104 to a threshold.

As described, touchdown detector 507 operates continually, even during servo (unless disabled by controller 102).

However, certain samples during that time may not be valid. For example, during servo, the samples are from the servo readback signal, and the same may be true of signals from "guard bands" before and after the servo periods. In addition, transients may occur when TDD_EN signal 405 is first asserted, and at the beginning and ending of write periods (rising and falling edges of WGATE signal 402). Therefore, in some implementations, those samples may be discarded or squelched. For example, FIG. 12 shows one example of a squelching scheme 1200.

Figure 12:
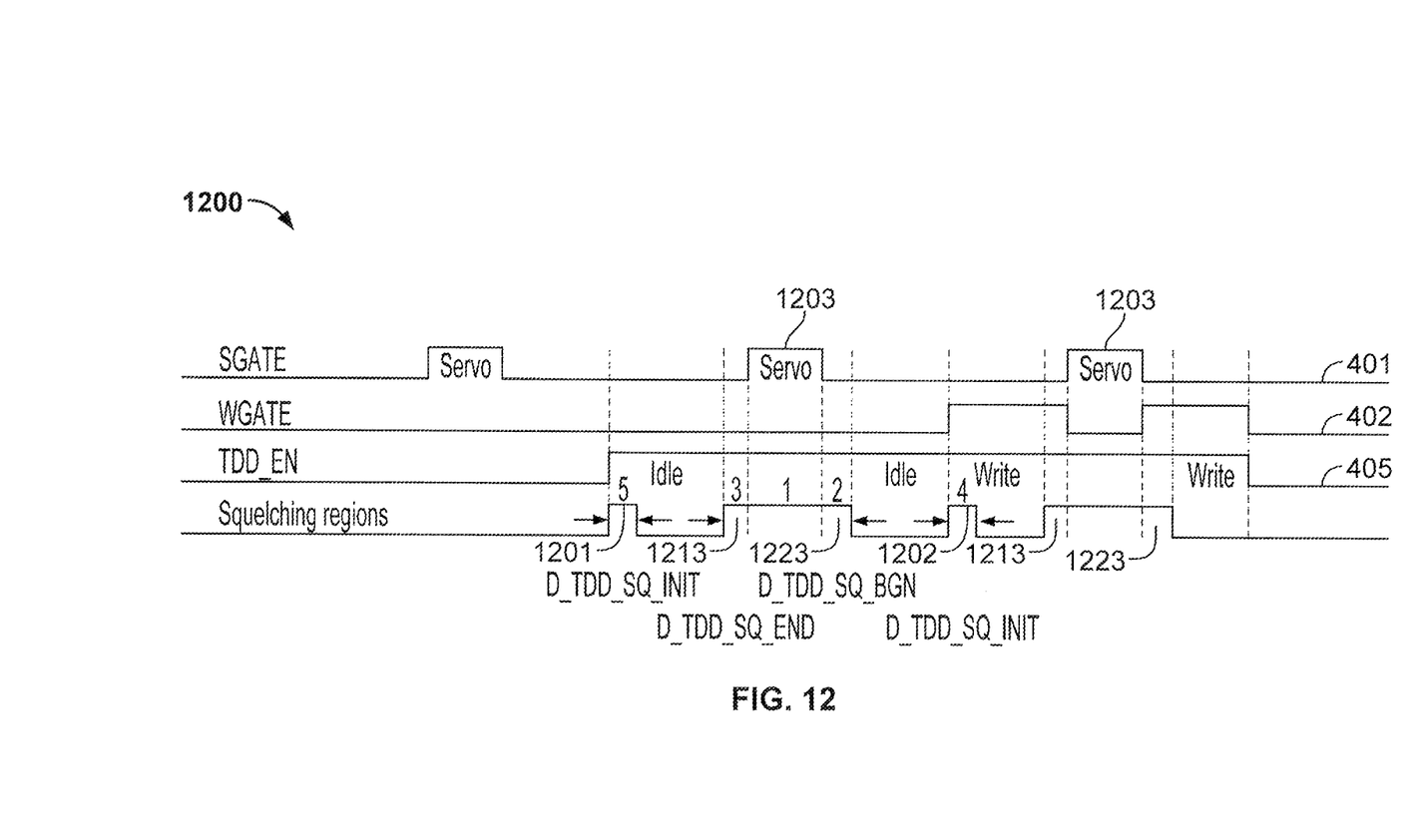
FIG. 12 is an example of a squelching scheme that may be used in implementations of this disclosure.

As shown in FIG. 12, samples are squelched in region 1201 just after TDD_EN signal 405 is first asserted. The number of samples squelched, D_TDD_SQ_INIT, may be specified by the user. That same number of samples also may be squelched in region 1202 after a rising edge of WGATE signal 402, as the same transient effects may be at work in both cases (although the number also could be different). In addition, there are two servo periods 1203 in FIG. 12 during the time that TDD_EN signal 405 is asserted. As shown, in both cases, not only are the CS samples squelched during periods 1203, but D_TDD_SQ_END samples are squelched during period 1213 before period 1203, and D_TDD_SQ_BGN samples are squelched during period 1223 after period 1203. As explained in more detail below, because read data channel 122 cannot predict the occurrence of a rising SGATE edge, a delay line is used to enable squelching before that rising edge. D_TDD_SQ_INIT samples also may be squelched after WGATE signal 402 is deasserted. However, that is not shown in FIG. 12 because the first time WGATE signal 402 is deasserted in FIG. 12 is the beginning of a servo period, where all samples are already squelched, and the second time WGATE signal 402 is deasserted TDD_EN signal 405 is turned OFF.

Figure 13:
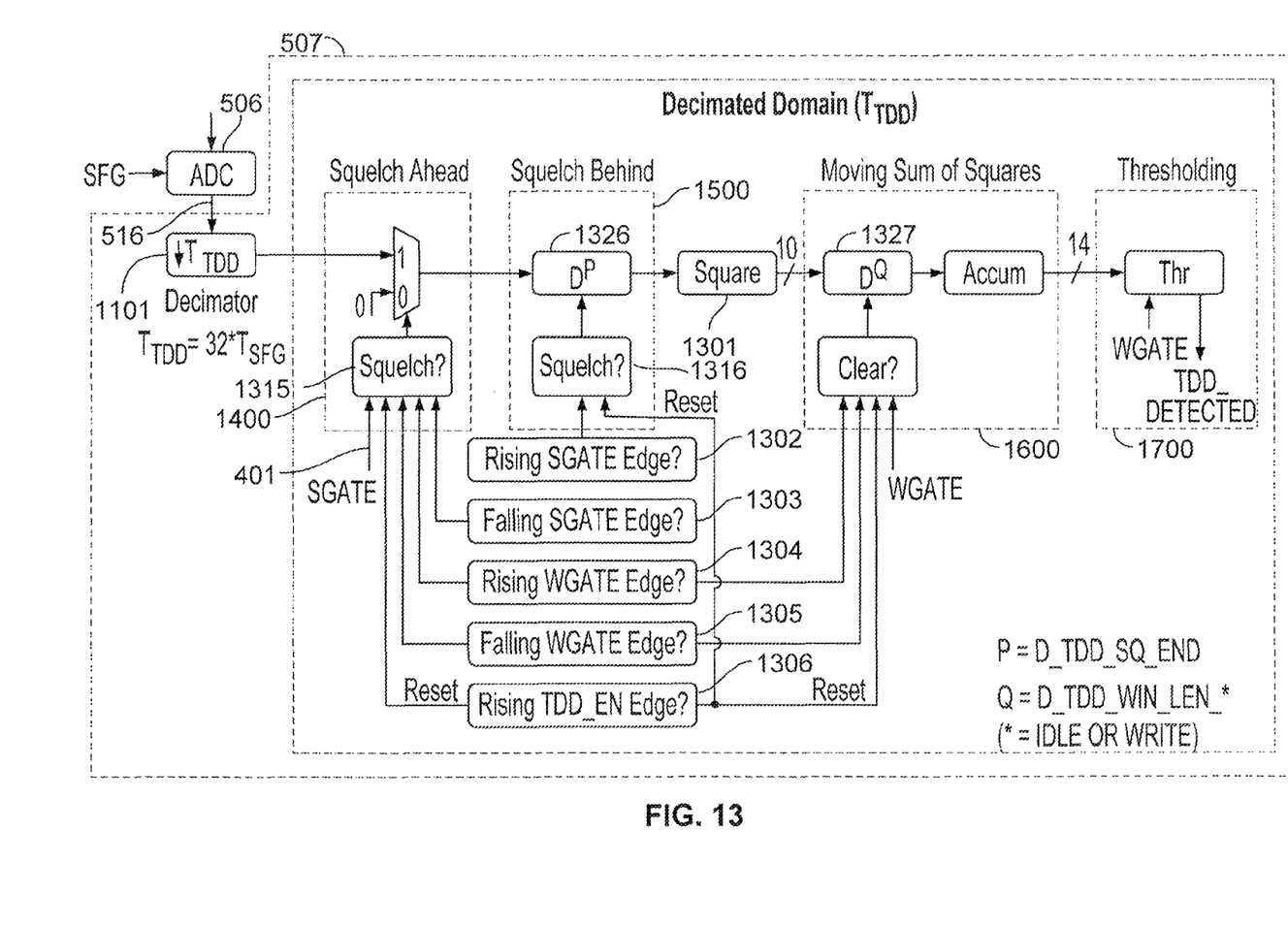
FIG. 13 is a representation of an example of an touchdown detection block according to an implementation of this disclosure.

FIG. 13 is a logical block diagram of touchdown detector block 507, although TDD block 507 could be implemented as the circuits shown in FIG. 13, to carry out the scheme of FIG. 11. Thus TDD block 507 includes decimation block or circuitry 1101, followed by a number of blocks operating in decimated domain 1300, including squelch-ahead block or circuitry 1400, squelch-behind block or circuitry 1500, square computation block or circuitry 1501, moving sum of squares block or circuitry 1600, and threshold detector block or circuitry 1700. As described in more detail below, squelch-ahead block 1400 and squelch-behind block 1500 each include respective squelch decision sub-blocks 1315, 1316, which rely on SGATE signal 401 and edge detectors 1302-1306, which respectfully detect the rising and falling edges of SGATE signal 401, the rising and falling edges of WGATE signal 402, and the rising edge of TDD_EN signal 405. Squelch-behind block 1500 also includes a shift register 1510 of length equal to 1 plus the number of samples to be squelched (D_TDD_SQ_END) which may be user-configurable. Similarly, moving sum of squares block 1600 includes a shift register 1604 of length equal to the sample window over which the sum of squares is to be taken (D_TDD_WIN_LEN) which may be user-configurable.

Figure 14:
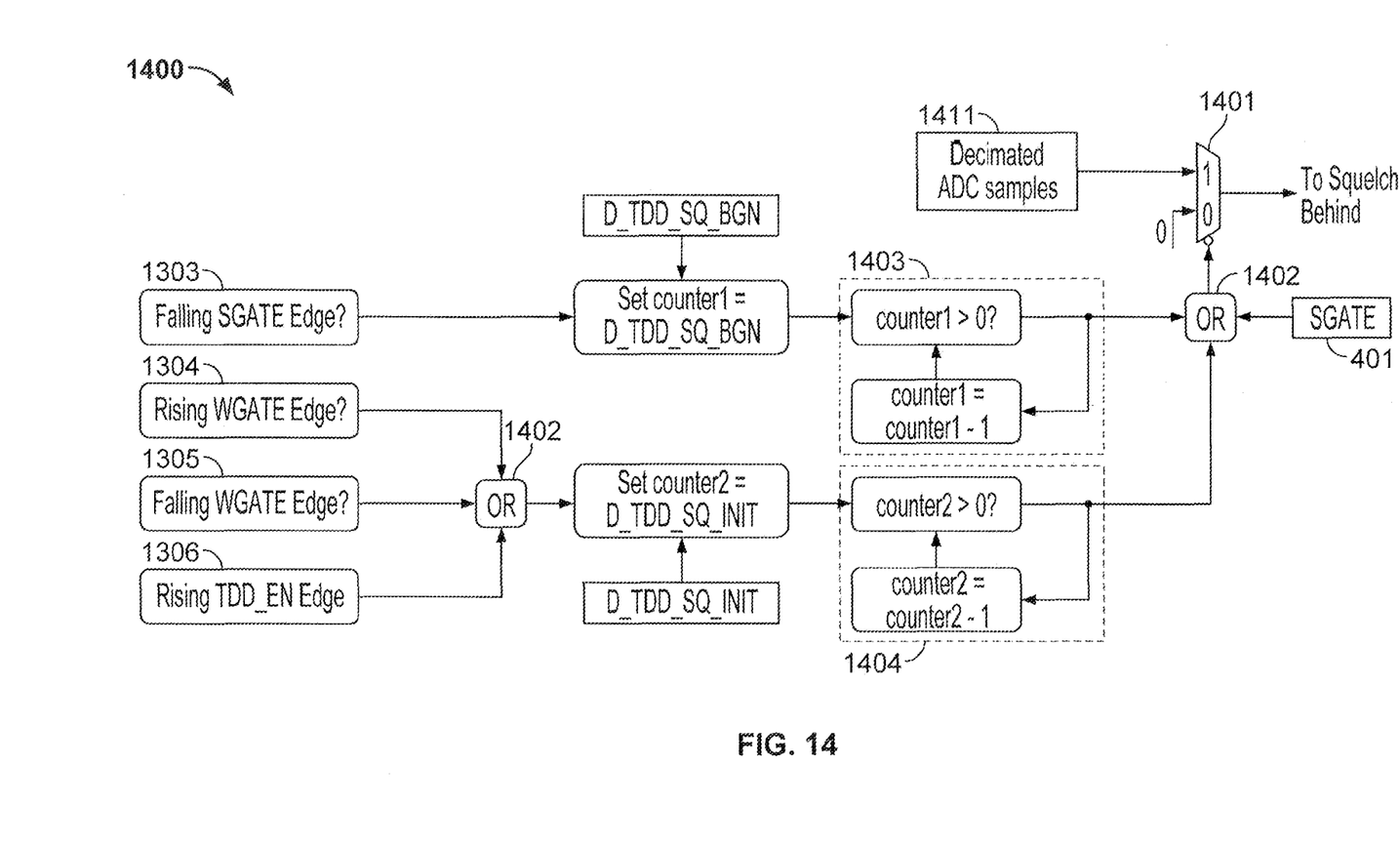
FIG. 14 is a representation of a squelch-ahead block according to an implementation of this disclosure.

Details of the logic of an implementation of squelch-ahead block 1400 are shown in FIG. 14, although squelch-ahead block 1500 could be implemented as the circuits shown in FIG. 14. Multiplexer 1401 outputs either the decimated samples 1411 from decimation block 1101, or all zeroes, depending on the output of three-input OR-gate 1402. The three inputs to OR-gate 1402 are SGATE signal 401, and the outputs of first and second counters 1403, 1404; if any of those signals is high, then squelching will occur. First counter 1403 is initialized to a number (D_TDD_SQ_BGN), which may be user-determined and could be input "live" or from a programmed register, of samples to be squelched after servo is concluded, and is triggered by a falling edge 1303 of SGATE signal 401. Thus, during servo, when SGATE signal 401 is high, samples will be squelched, and once servo ends and SGATE signal 401 falls, first counter 1403 will start to count down until it reaches 0, so that D_TDD_SQ_BGN additional samples will be squelched.

Second counter 1404 is initialized to a number (D_T-DD_SQ_INIT), which may be user-determined and could be input "live" or from a programmed register, of samples to be squelched during transient conditions (before or after writing, or when the touchdown detector is first enabled). Second counter 1404 is triggered by the rising edge 1304, 1306 of WGATE signal 402 or TDD_EN signal 405, or by the falling edge 1305 of WGATE signal 402, and will count down to 0, so that D_TDD_SQ_INIT samples are squelched during these transient conditions.

Figure 15:
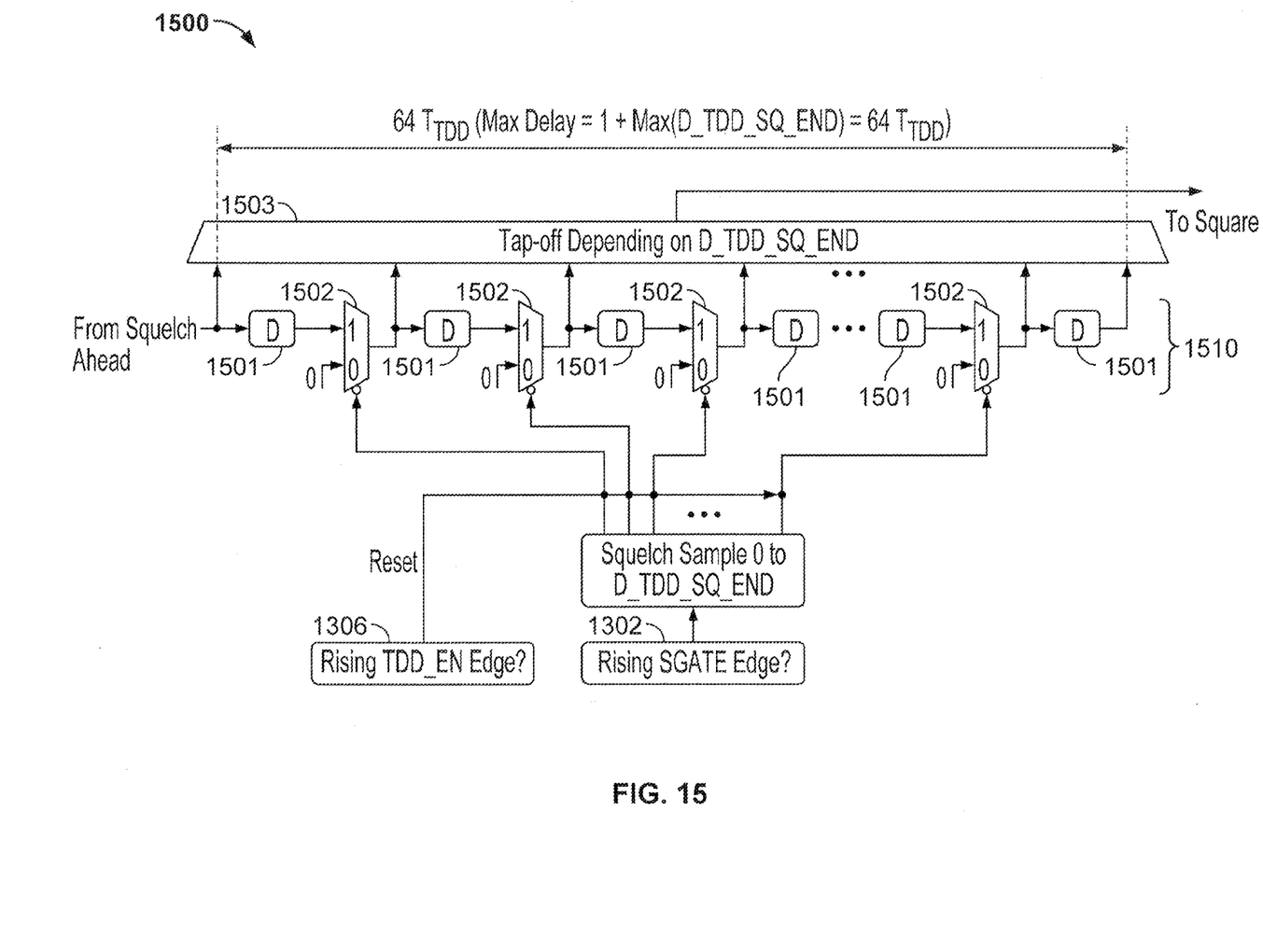
FIG. 15 is a representation of a squelch-behind block according to an implementation of this disclosure.

Details of the logic of an implementation of squelch-behind block 1500 are shown in FIG. 15, although squelch-behind block 1500 could be implemented as the circuits shown in FIG. 15. As noted above, shift register 1510 has a length equal to 1 plus the maximum number (D_TDD_SQ_END) of samples to be squelched, up to a predetermined maximum number of decimation periods (e.g., 64 samples). A respective multiplexer 1502 between each register 1501 in shift register chain 1510 selects between 0 and the contents of the respective register and outputs to larger multiplexer 1503. D_TDD_SQ_END controls multiplexer 1503 to select which register output is propagated to square computation block 1301, determining the delay. In the event of a rising edge 1302 of SGATE signal 401, multiplexers 1502 output 0 instead of the values of the respective registers, effectively squelching the D_TDD_SQ_END samples preceding the rising SGATE edge (because those preceding samples have not yet been propagated, and now never will be, it is as though they were squelched predictively). In the event of a rising edge 1306 of TDD_EN, meaning that the touchdown detector has been newly switched on, shift register 1326 is reset to discard any old data in the squelch-behind buffer.

Figure 16:
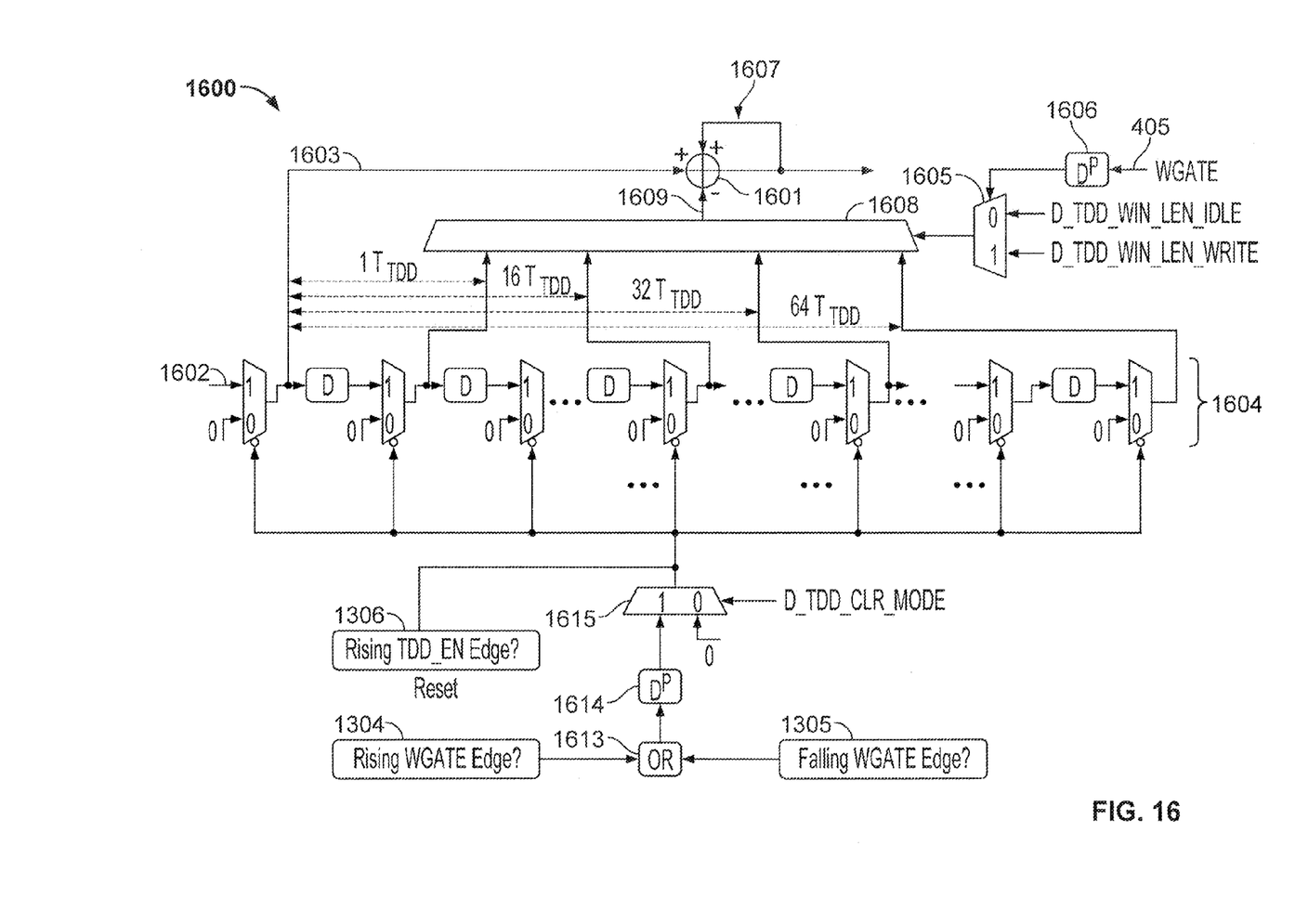
FIG. 16 is a representation of a moving sum of squares block according to an implementation of this disclosure.

Details of the logic of moving sum of squares block 1600 are shown in FIG. 16, although moving sum of squares block 1600 could be implemented as the circuits shown in FIG. 16. The sum of squares is accumulated in adder 1601. Incoming values from square computation block 1301 are input at 1602.

The window length is set by the user, who in this example may set two different values—D_TDD_WIN_LEN_IDLE for the window length in idle mode, and D_TDD_WIN_LEN_WRITE for the window length in write mode, which may be user-determined and could be input "live" or from programmed registers. The appropriate value is selected by multiplexer 1605, which is gated by WGATE signal 402, delayed at 1606 by a delay corresponding to the length (D_TDD_SQ_END) of buffer or shift register 1604 (so that the change in window length based on changes from "write" to "idle" or vice-versa is subject to the same delay as the moving sum).

The newest incoming value 1603 is tapped off before shift register 1604 and accumulated at 1607 by adder 1601. The oldest value, selected by multiplexer 1608, is subtracted at 1609 to keep the moving sum current.

In the event of a rising edge 1306 of TDD_EN, meaning that the touchdown detector has been newly switched on, shift register 1604 is reset to discard any old data in the moving-sum buffer. Similarly, after a rising (1304) or falling (1305) edge of WGATE signal 402—i.e., after a transition into or out of write mode, as selected by OR-gate 1613 and delayed by a delay 1614 (again corresponding to the length (D_TDD_SQ_END) of buffer or shift register 1604, so that actions based on changes from "write" to "idle" or vice-versa are subject to the same delay as the moving sum), shift register 1604 is cleared, assuming that, as determined at multiplexer 1615, the user has set the value D_TDD_CLR_MODE to activate the clearing mode.

Figure 17:
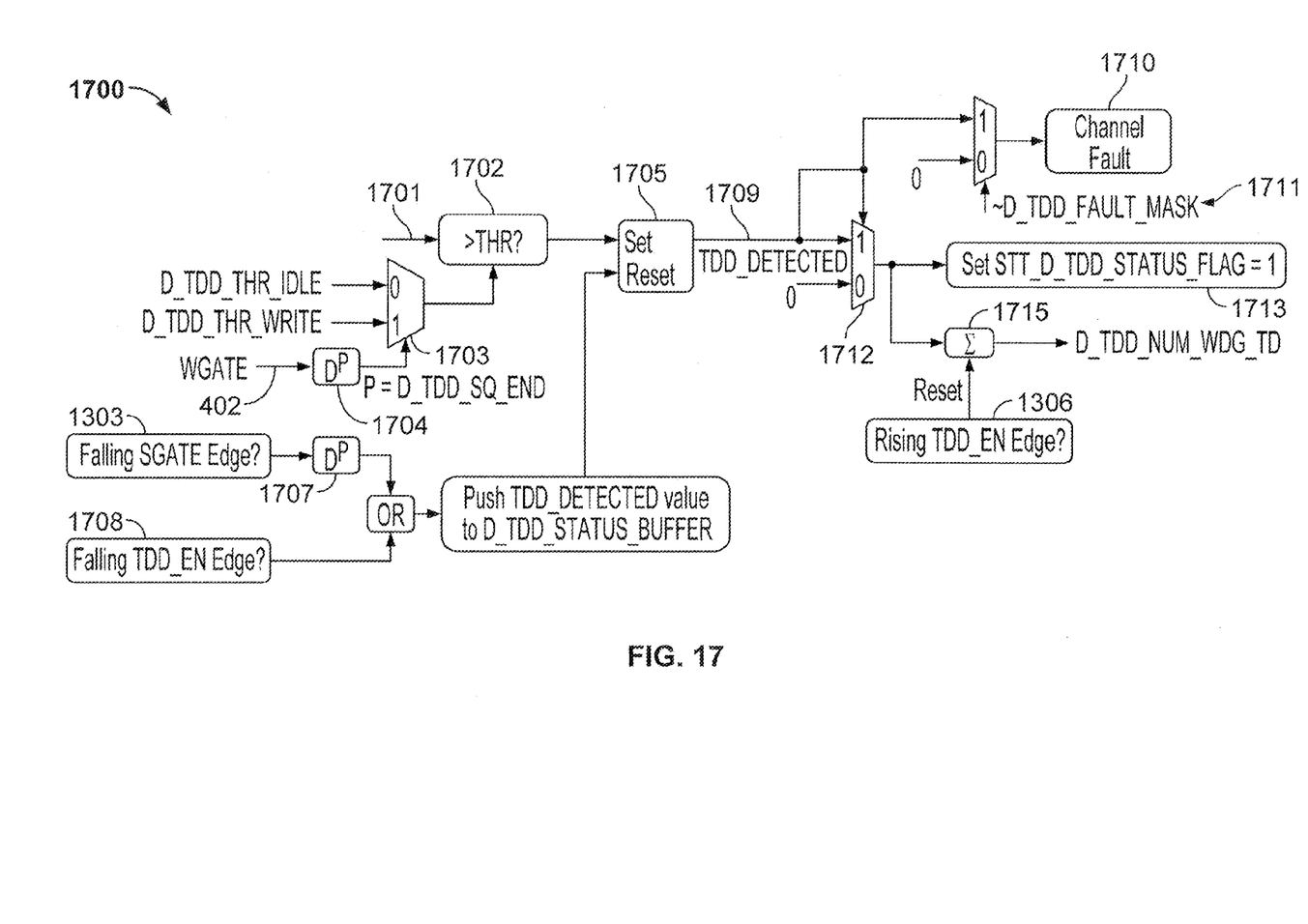
FIG. 17 is a representation of a threshold detector block according to an implementation of this disclosure.

Details of the logic of threshold detector block 1700 are shown in FIG. 17, although threshold detector block 1700 could be implemented as the circuits shown in FIG. 17. The moving sum from block 1600 is input at 1701 to comparator 1702. The threshold in comparator 1702 is set by the user, who in this example may set two different values—D_TDD_THR_IDLE for the threshold in idle mode, and D_TDD_THR_WRITE for the threshold in write mode, which may be user-determined and could be input "live" or from programmed registers. The appropriate threshold value is selected by multiplexer 1703, which is gated by WGATE signal 402, delayed at 1704 by a delay corresponding to the length (D_TDD_SQ_END) of shift register 1604 (so that the change in threshold based on changes from "write" to "idle" or vice-versa is subject to the same delay as the moving sum being input at 1701).

The output of comparator 1702 is registered at 1705, and released on a falling edge 1303 of SGATE signal 401 (delayed by a delay 1707, again corresponding to the length (D_TDD_SQ_END) of shift register 1604, so that actions based on changes from "servo" mode to either "write" to "idle" are subject to the same delay as the moving sum), or on a falling edge 1708 of TDD_EN (so that the TDD_DETECTED value for the last wedge can be stored before the touchdown detector is turned off.

Once TDD_DETECTED signal 1709 is released, it sets a channel fault condition at 1710, unless at 1711 the user has elected to mask the fault by setting D_TDD_FAULT_MASK=1. TDD_DETECTED signal 1709 also turns on multiplexer 1812, propagating itself to set the STT_D_TDD_STATUS_FLAG flag 1813. Once flag 1713 has been set, it must be reset by the user (or by an external process), and therefore once one touchdown event occurs even for only one servo wedge period, there will always be an indication. TDD_DETECTED signal 1709 also is propagated to accumulator 1715, which stores the sum of the value of TDD_DETECTED signal 1709 for, in this implementation, the last sixteen wedges (the number of wedges could be higher, or, less likely, lower, in other implementations), unless and until it is reset by a rising edge 1306 of TDD_EN (meaning that the touchdown detector has been newly switched on). Note that the rising edge 1306 of TDD_EN does not reset STT_D_TDD_STATUS_FLAG flag 1713. The sum 1715 represents the number of wedges out of the last sixteen (or other number of) wedges in which TDD_DETECTED signal 1709 was high.

There are many possibilities, as determined by users, as to how a particular implementation would treat the output of a touchdown detector. For example, there is as case where it is necessary to distinguish between intermittent and full touchdown, then the controller may monitor the number of wedges that were in touchdown in the recent past—e.g., in the last revolution. If only a few wedges were flagged as being in touchdown, then there were most likely intermittent touchdowns. But if many consecutive wedges were flagged, then there was more likely to a full touchdown.

Thus it is seen that a touchdown detection method, and corresponding apparatus, in which head contact sensor signals are processed in the digital domain to provide touchdown indication within about one servo wedge period of a touchdown event, rather than within one revolution, has been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of detecting head touchdown in a storage device, comprising:
    monitoring storage device head contact sensor signals; and
    processing the monitored storage device head contact sensor signals in a digital domain; wherein:
    the processing occurs in a read channel of the storage device.

2. The method of claim 1 wherein the processing monitors for head touchdown only during other than read operations.

3. The method of claim 2 wherein the processing monitors for head touchdown during idle periods.

4. The method of claim 2 wherein, during servo read operation:
    the storage device head contact sensor continues to generate signals; and
    the storage device head contact sensor signals are squelched.

5. The method of claim 4 further comprising squelching the storage device head contact sensor signals during an interval following the servo read operation.

6. The method of claim 4 further comprising squelching the storage device head contact sensor signals during an interval preceding the servo read operation.

7. The method of claim 6 further comprising delaying the storage device head contact sensor signals by an amount greater than the interval preceding the servo read operation to allow squelching during an interval preceding the servo read operation.

8. The method of claim 2 further comprising squelching the storage device head contact sensor signals upon beginning the processing.

9. The method of claim 2 further comprising squelching the storage device head contact sensor signals for at least one of an interval following entry into write mode or an interval following exit from write mode.

10. The method of claim 1 wherein the processing comprises:
    accumulating a moving sum of squares of the storage device head contact sensor signals; and
    comparing the moving sum of squares of the storage device head contact sensor signals to a threshold.

11. The method of claim 10 wherein the accumulating comprises delaying the squares of the storage device head contact sensor signals by a window length.

12. The method of claim 10 wherein the processing further comprises:
    setting a flag when the moving sum of squares of the storage device head contact sensor signals exceeds the threshold; and
    accumulating flags occurring over a predetermined duration.

13. Apparatus for detecting head touchdown in a storage device, comprising:
    a storage device head contact sensor; and
    a processing module that processes storage device head contact sensor signals in a digital domain; wherein:
    the processing module is in a read channel of the storage device.

14. The apparatus of claim 13 wherein the processing module monitors for head touchdown only during other than read operations.

15. The apparatus of claim 14 wherein the processing module monitors for head touchdown during idle periods.

16. The apparatus of claim 14 wherein, during servo read operation:
    the storage device head contact sensor continues to generate signals; the processing module further comprising:
    servo-squelch control to squelch the storage device head contact sensor signals during servo read operation, the servo-squelch control including at least one of:
    squelch-ahead control to squelch the storage device head contact sensor signals during an interval following the servo read operation,
    squelch-behind control to squelch the storage device head contact sensor signals during an interval preceding the servo read operation,
    enable-squelch control to squelch the storage device head contact sensor signals upon activation of the processing module, or
    write-squelch control to squelch the storage device head contact sensor signals for at least one of an interval following entry into write mode or an interval following exit from write mode.

17. The apparatus of claim 16 wherein the squelch-ahead control comprises a squelch-ahead delay to delay the storage device head contact sensor signals by an amount greater than the interval preceding the servo read operation to allow squelching during an interval preceding the servo read operation.

18. The apparatus of claim 13 wherein the processing module comprises:
    a moving sum accumulator that accumulates a moving sum of squares of the storage device head contact sensor signals; and
    a comparator that compares the moving sum of squares of the storage device head contact sensor signals to a threshold.

* * * * *